United States Patent [19]

Tamminen

[11] 4,366,213

[45] Dec. 28, 1982

[54] BATTERY AND CONTACT COMBINATION

[76] Inventor: Pentti J. Tamminen,
Kaskenkaatajantie 12 D, 02100
Espoo 10, Finland

[21] Appl. No.: 274,122

[22] Filed: Jun. 16, 1981

[51] Int. Cl.³ .............................................. H01M 2/20
[52] U.S. Cl. .................................... 429/110; 429/123;
429/178; 429/185
[58] Field of Search ................. 429/65, 110, 113, 121,
429/123, 162, 153, 122, 163, 178, 185

[56] References Cited

U.S. PATENT DOCUMENTS 2,798,895 7/1957 Nowotny .............................. 429/153
2,862,390 12/1958 Harris ................................... 429/110
3,080,445 3/1963 Brown ................................. 429/153
4,060,670 11/1977 Tamminen .......................... 429/162

Primary Examiner—Donald L. Walton
Attorney, Agent, or Firm—Ladas & Parry

[57] ABSTRACT

The invention relates to a battery and contact combination comprising a battery with at least one cell, a plastic casing enclosing said battery, and current collector means. At least one of the terminals of the battery is arranged inside the casing adjacent to its inner surface, and the current collector means comprise at least one such contact element which is arranged to penetrate said casing and to make contact with said terminal. The contact element is kept in place by a resilient clamping means.

9 Claims, 13 Drawing Figures

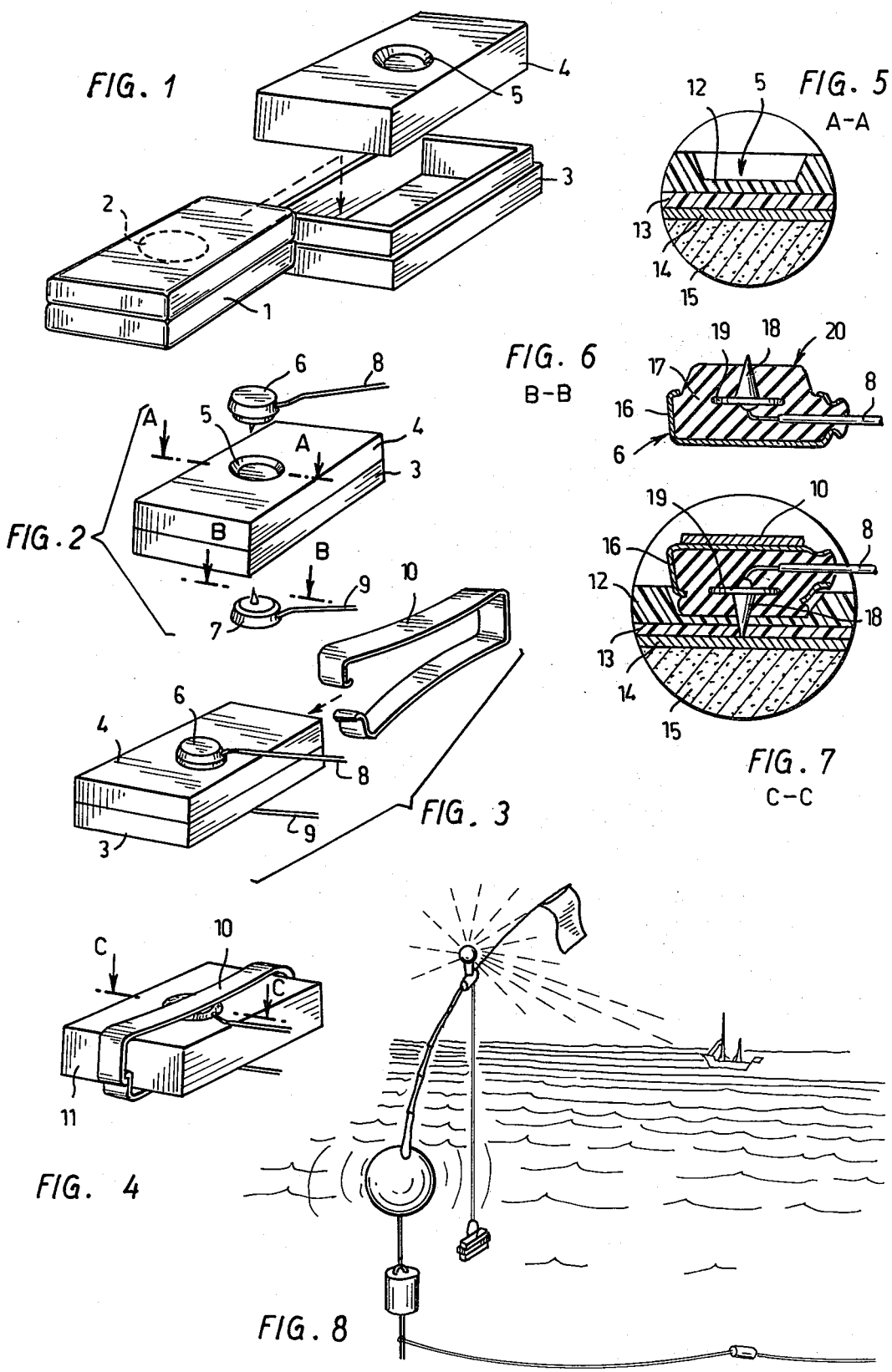

U.S. Patent  Dec. 28, 1982  Sheet 2 of 2  4,366,213
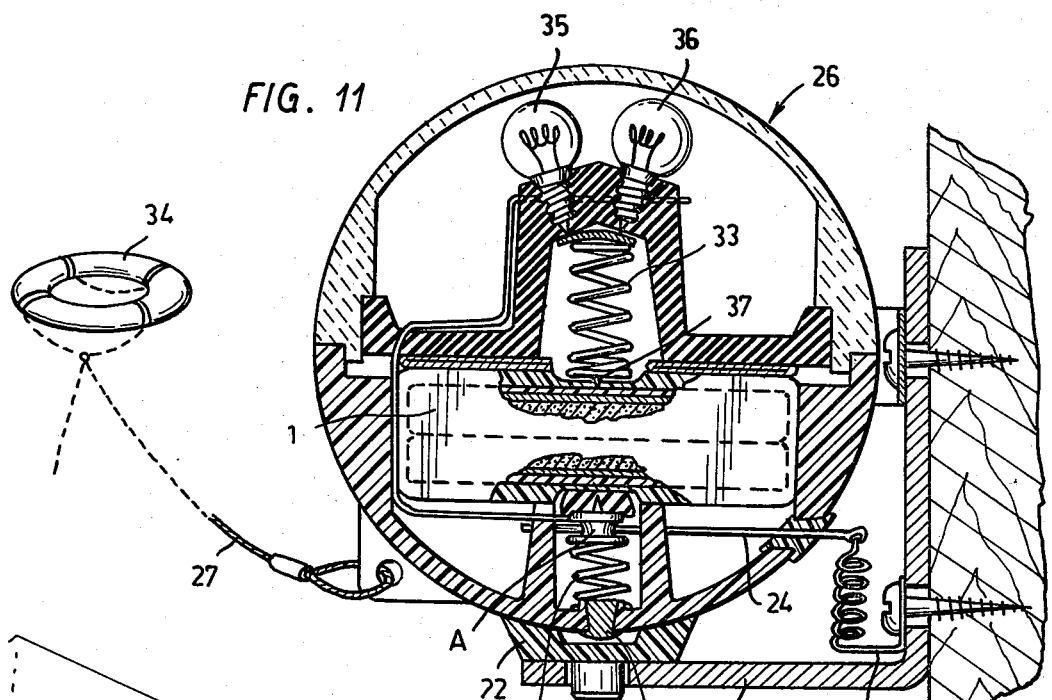
FIG. 11
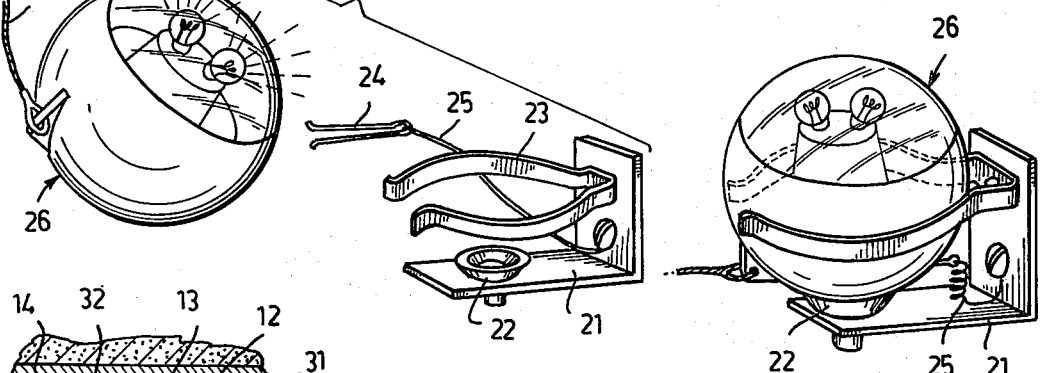
FIG. 10
FIG. 9
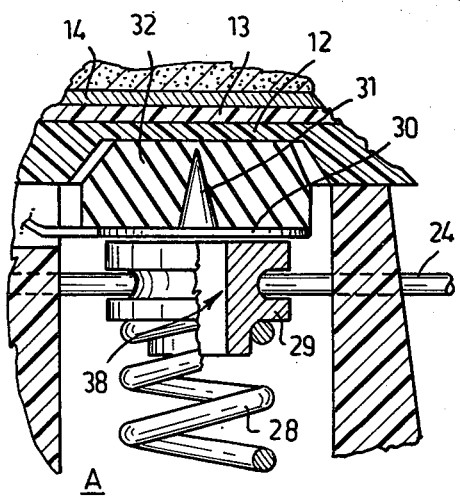
FIG. 12
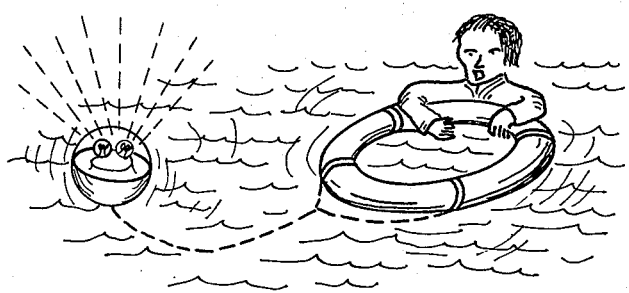
FIG. 13

BATTERY AND CONTACT COMBINATION

The present invention relates to a battery and contact combination comprising a battery with at least one cell, a plastic casing enclosing said battery, and current collector means.

In previously known batteries, the positive and negative terminals or contact elements project from the battery or are else subject to the atmosphere. If, for example, during the transport of such batteries, the contact elements are short-circuited, the battery will be destroyed almost at once. Such a short-circuit may be caused through conducting liquids and metallic objects with which the battery comes into contact.

It is the object of the present invention to eliminate the above-mentioned disadvantages and to provide a battery and contact combination of a new type. The invention is based on the idea that the battery and contact elements are separate and are, when necessary, connected to each other.

In the combination according to the invention, at least one of the terminals of the battery is arranged inside the casing adjacent to its inner surface, and the current collector means comprise at least one contact element which is arranged to penetrate said casing and to make contact with said terminal, the combination further comprising clamping elements for clamping said contact element in place.

By means of the invention substantial advantages are achieved.

The storage time for batteries can be substantially lengthened, especially if hermetically sealed plastic casings are used. Such batteries can be packed, for example, in a metal container without any risk of short-circuit.

The battery can be immersed completely inert, for example, in a conducting salt solution (sea-water) without fear of leakage currents. The hermeticity is maintained even after the contact elements penetrating the battery casing have been connected to the battery.

By means of the battery according to the invention considerable space is further saved. The battery according to the invention is also mechanically durable because it has no contact elements which would weaken the construction.

The invention will now be described in more detail by means of the embodiments according to the accompanying drawings.

FIG. 1 illustrates the insertion of a plate battery into a casing consisting of two parts.

FIG. 2 shows the casing when closed and the contact elements ready to be installed.

FIG. 3 shows the contact elements when installed in place and the clamping element ready to be installed.

FIG. 4 illustrates a casing of hermetic type with the contact elements and the clamping element installed in place.

FIG. 5 shows on an enlarged scale the weakened part in FIG. 2 as a section taken along line A—A.

FIG. 6 shows on an enlarged scale a contact element as a section taken along line B—B in FIG. 2.

FIG. 7 illustrates on an enlarged scale a contact element installed in place and as a section taken along line C—C in FIG. 4.

FIG. 8 illustrates the use of a battery according to the invention as a sea-fishing application.

FIG. 9 shows a battery-operated light signal device to be connected to a life buoy and arranged on a frame.

FIG. 10 shows the device according to FIG. 9 when removing the device from the frame.

FIG. 11 is a longitudinal section on an enlarged scale of the device according to FIG. 9.

FIG. 12 shows on an enlarged scale one contact pin arrangement of FIG. 11.

FIG. 13 illustrates the operation of the device according to FIG. 9 in a practical situation.

In the embodiment according to FIG. 1, a plate battery 1 is under the battery surface provided with a terminal plate 2. A weakening 5, which in this case comprises a recess (cf. also FIG. 5), is made at the terminal plate in a plastic casing consisting of two parts 3 and 4. When the casing 3, 4 is sealed according to FIG. 2, there are no conducting parts on the battery surface. Contact elements 6, 7 provided with insulated conductors 8, 9 can be inserted into the recesses 5 in the casing 3, 4 (FIGS. 2 and 3).

Each contact element 6, 7 comprises a cassette-shaped plastic or metal housing 16, which is open on one side. In this housing is arranged a pad 17 of resilient material, for example, silicone rubber, which planarly extends somewhat beyond the edge of the cassette 16. In this pad 17 is resiliently embedded a sharp metallic contact pin 18 provided with a flange 19 so that the point of the pin is visible outside the free surface 20 of the pad 17. The contact pin 18 is galvanically connected to the insulated conductor 8, which projects out of the cassette 16 and the other end of which can be passed to the object of use.

In the embodiment according to FIG. 3, the contact elements 6, 7 are secured in place by means of a resilient steel strap 10 which presses the contact elements 6, 7 into the recesses 5 in the battery casing 3, 4. The pad 17 of a resilient compound is then somewhat compressed, while exposing the contact pin 18. This pin first penetrates the weakened portion 12 in the plastic casing and thereafter a soft layer 13 in the surface of the battery cell itself, while making contact with the terminal plate 14 of the battery. It is to be noted that said pad of resilient material produces, when the contact element is clamped in place, a hermetic sealing around the contact point (pin). The soft layer in the battery cell may be, for example, bitumen or polyisobutylene.

In the embodiment according to FIG. 4, the plastic casing 11 is hermetically sealed and made of any suitable plastics material, e.g., foamed polyurethane, by molding directly around the battery.

In the sea-fishing application according to FIG. 8, a signal light in a buoy is supplied with energy form a hermetically sealed battery according to the invention, which battery is suspended on conductors under the water.

In the battery application according to FIGS. 9 to 13, a plastic casing provided with weakenings is with its batteries mounted in a light signal device intended to be floating and arranged to be loosened in connection with a life buoy. The light signal device 26 is spherical and transparent in its upper part and contains two lamps 35 and 36. It is fastened to an L-shaped frame 21 on a rubber support 22 and a fork 23. Its housing is connected to a life buoy 34 by means of a string 27.

A helical spring 33 (FIG. 11) continuously presses the contact element against the upper weakening in the plastic casing so that the pin 37 penetrates said weakening and a bitumen layer on the surface of the cell, while making contact with the terminal plate of the battery. In this case the battery and the plastic casing enclosing it are cylindrical.

In the lower part of the casing the arrangement is such that a corresponding weakened portion is provided with a pad 32 of resilient material which is nearly throughout its thickness penetrated by a pin 31 inserted from outside. The pad 32 is in rest position. Under a flange 30 adjoining the pin 31 a pushing element 29, which is continuously loaded by a helical spring 28, is locked in place by means of a cotter 24. When the signal light device 26, as the life buoy 34 is thrown into the water, is loosened from the frame 21, the string 27 fastened thereto pulls the cotter 24 loose while releasing the pushing element 29 to press the contact pin 31. At this moment, this pin 31 penetrates the weakening 12 in the plastic casing and the insulating layer 13 in the cell, while making contact with the terminal plate 14, whereby the circuit is closed and the lamps 35, 36 are lit.

The bottom of the light signal device 26 is provided with an opening covered by a rubber plug 37, and the pushing element 29 is provided with an axial through channel. By inserting a pin or similar through these openings and by pressing it against the flange 30 of the contact pin 31 so that the pin 31 makes contact with the terminal 14 in the battery the functional readiness of the device can be checked without endangering its working order.

Also other constructions can be contemplated within the scope of the invention. Thus, the plastic coating need not be weakened in its contact points. Instead, it can from the start be made of a material which is thin enough to permit easy penetration by the contact pins. Further, the casing can be intended for penetration from one side only while, on the other side, a metal plate functioning as the second terminal of the battery is located in the surface of the casing.

The contact element can also be double-sided, i.e. provided with two oppositely directed pins for permitting connections between batteries and tapping.

What I claim is:

1. A battery and contact combination, comprising:
   (a) a battery with at least one cell,
   (b) a plastic hermetically sealed casing enclosing said battery, at least one of the terminals of the battery being arranged inside said casing close to its inner surface,
   (c) current collector means including at least one contact element adapted to penetrate said casing at a weakened point thereof and make contact with said terminal, said contact element comprising a sharp metallic contact pin at least partly embedded in a pad of a resilient compound, said pad being compressed against the area surrounding the contact point to seal said area, and
   (d) clamping elements for clamping said contact element in place.

2. A combination as claimed in claim 1, wherein said resilient compound is silicone rubber.

3. A combination as claimed in claim 1, wherein said pin at its base is provided with a flange transverse to the direction of the pin, for applying the resilient compressive force on said pin.

4. A combination as claimed in claim 1, wherein said contact element is provided with two oppositely directed pins for effecting interconnections between batteries.

5. A combination as claimed in claim 1, wherein said pad of resilient material is protected with a reinforcing housing.

6. A combination as claimed in claim 1, wherein said weakening is a recess in the surface of said plastic casing.

7. A combination as claimed in claim 1, wherein said clamping elements comprise a resilient, band-shaped clamping strap to be arranged around said plastic casing on said contact elements.

8. A combination as claimed in claim 1, wherein said clamping element comprises a helical spring.

9. A combination as claimed in claim 8, wherein the compressive action applied by said clamping element on said contact pin is, before connecting the battery, prevented by means of a withdrawable cotter.

* * * * *